United States Patent [19]

Iversen et al.

[11] Patent Number: 5,618,148

[45] Date of Patent: Apr. 8, 1997

[54] METHOD AND ARRANGEMENT FOR TRANSPORTING LARGER UNITS

[75] Inventors: Øyvind T. Iversen; Jan-Erik Keim, both of Drøbak, Norway

[73] Assignee: TTS Drøbak A/S, Drøbak, Norway

[21] Appl. No.: 386,643

[22] Filed: Feb. 10, 1995

[30] Foreign Application Priority Data

Feb. 11, 1994 [NO] Norway .................................... 940469

[51] Int. Cl.$^6$ .................................................. B63B 27/00
[52] U.S. Cl. .................... 414/139.9; 414/139.6; 414/140.1; 414/786
[58] Field of Search ............... 414/139.4, 139.6, 414/139.9, 140.1, 786, 340, 341, 345, 347, 495, 498, 139.7

[56] References Cited

U.S. PATENT DOCUMENTS

| | | | |
|---|---|---|---|
| 761,810 | 6/1904 | Anderson | 414/139.6 |
| 2,247,144 | 6/1941 | Baldwin | 414/140.1 |
| 3,091,188 | 5/1963 | Graham | 414/139.9 |
| 3,727,776 | 4/1973 | Meeusen | 214/14 |
| 3,819,065 | 6/1974 | Tomizawa et al. | 414/139.6 |
| 3,846,860 | 11/1974 | Kummerman | 414/143.2 |
| 4,590,634 | 5/1986 | Williams | 414/139.6 |
| 4,591,310 | 5/1986 | Toaspern et al. | 414/139.6 |
| 4,770,589 | 9/1988 | Bryan | 414/139 |
| 4,897,012 | 1/1990 | Brewer | 414/139.4 |
| 5,033,928 | 7/1991 | Suominen | 414/495 |
| 5,378,105 | 1/1995 | Falko | 414/495 |
| 5,388,657 | 2/1995 | Shiraishi | 414/495 |
| 5,511,922 | 4/1996 | Sekiguchi et al. | 414/139.6 |

FOREIGN PATENT DOCUMENTS

| | | | |
|---|---|---|---|
| 165235 | 9/1987 | Denmark . | |
| 0628308 | 6/1927 | France | 414/139.4 |
| 2555652 | 7/1976 | Germany . | |
| 0218493 | 12/1983 | Japan | 414/139.4 |
| 5338816 | 12/1993 | Japan | 414/139.4 |
| 5338815 | 12/1993 | Japan | 414/139.4 |
| 461522 | 8/1987 | Sweden . | |

Primary Examiner—Karen B. Merritt
Assistant Examiner—Douglas Hess
Attorney, Agent, or Firm—Fish & Neave; Jeffrey H. Ingerman

[57] ABSTRACT

The present invention relates to a method and an arrangement for transporting larger units, especially for loading and unloading containers, and for the purpose of providing a new and fast loading and unloading system having a large degree of safety operation and which reduces handling time substantially, it is according to the invention suggested that there are used pallets (1; 101) which on the upper side are adapted for receiving and locking a plurality of containers having a total weight of up to 600–875 tons (1A; 101A), for example up to 20–25 containers, and which on the lower side comprise supporting legs (1B; 101B) or crossbars which therebetween or therearound, respectively, allow for free passing of transfer trolleys (2; 102) in picking up position, i.e. running in and out from any side of the pallet.

26 Claims, 6 Drawing Sheets

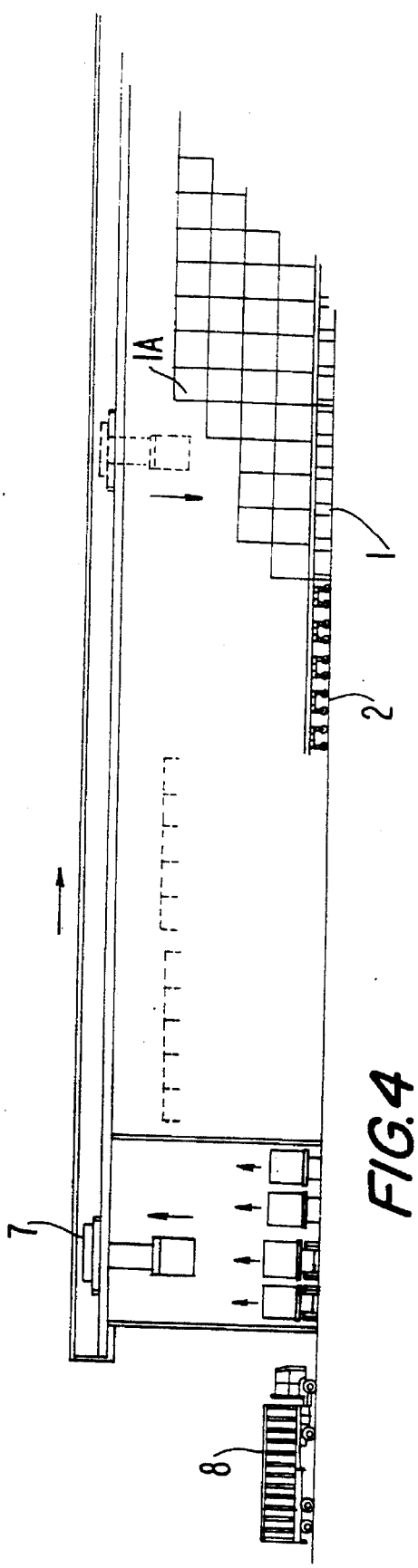
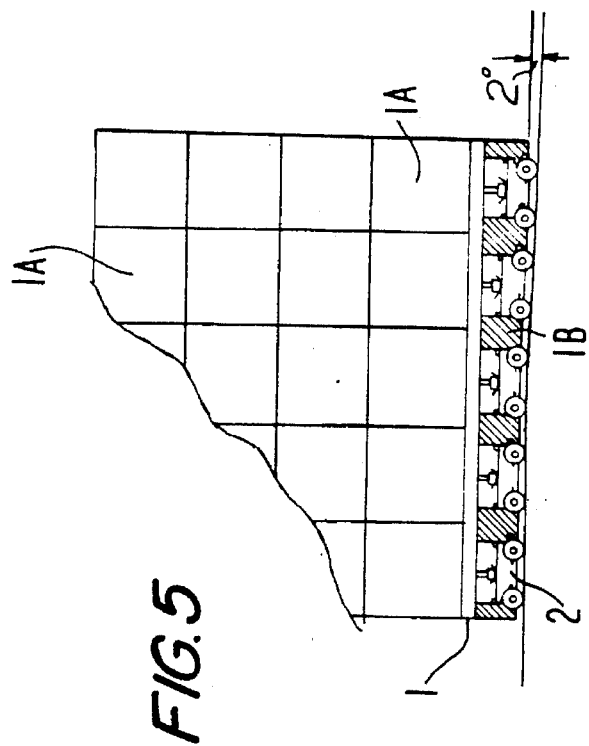
FIG.4
FIG.5

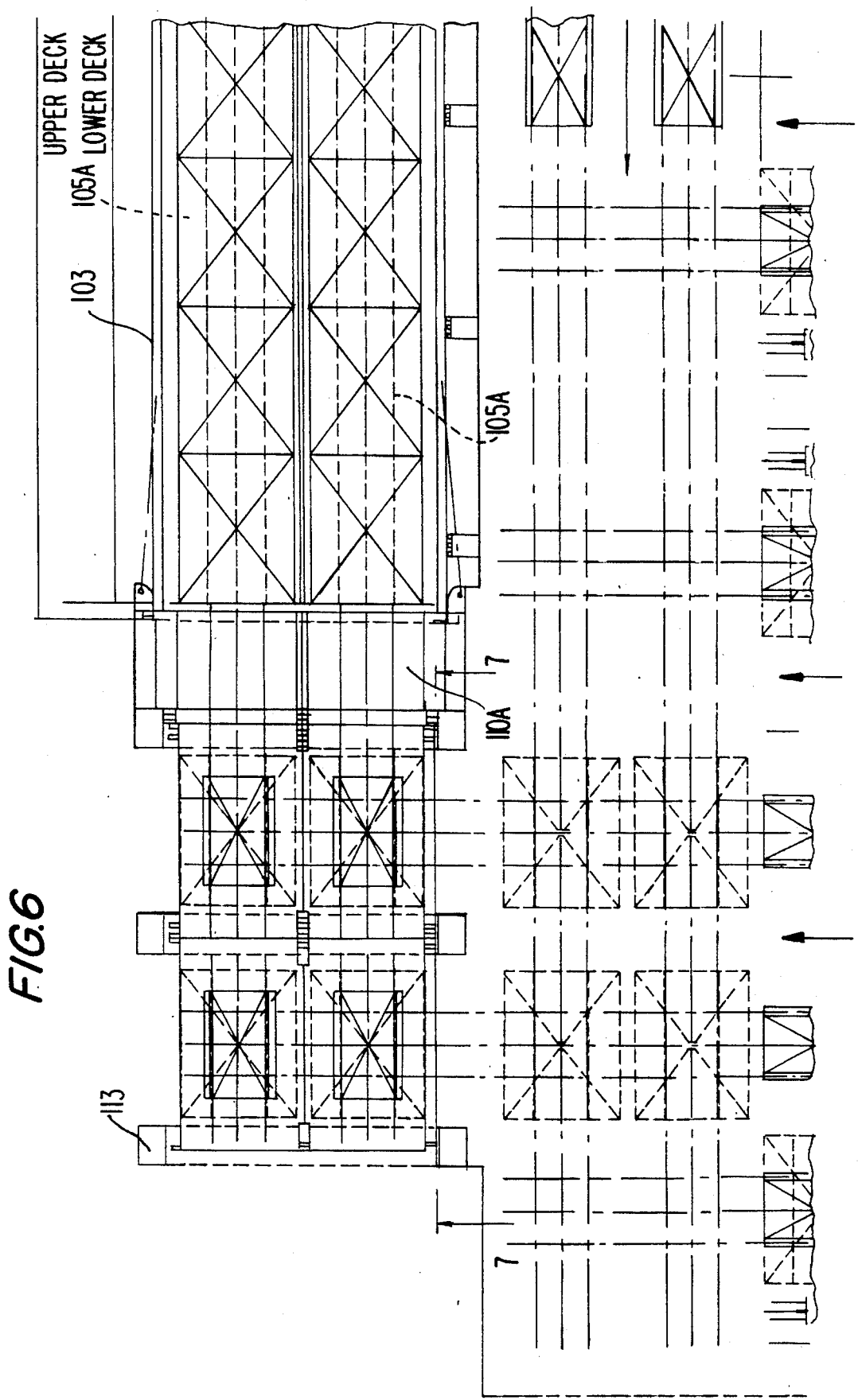

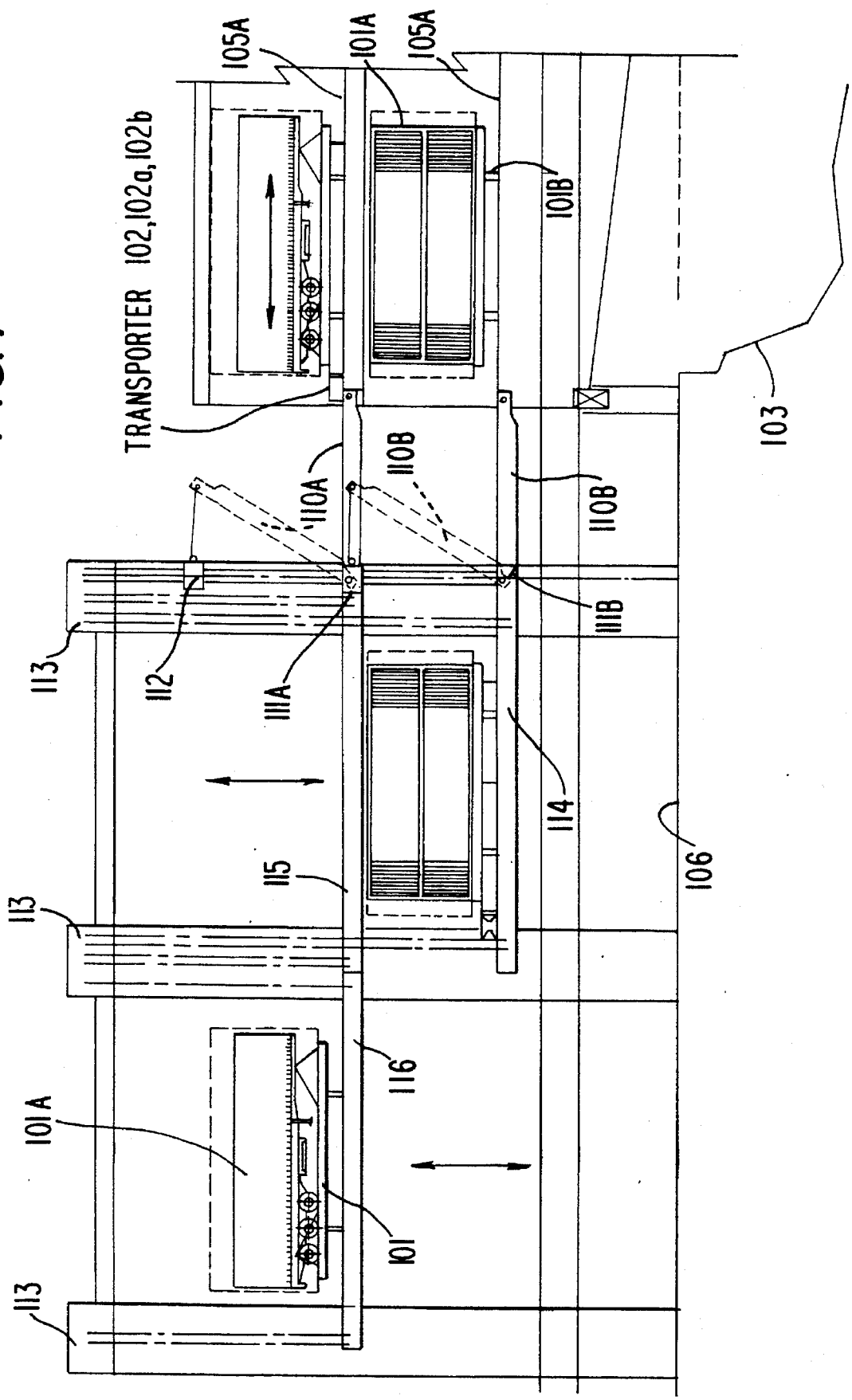

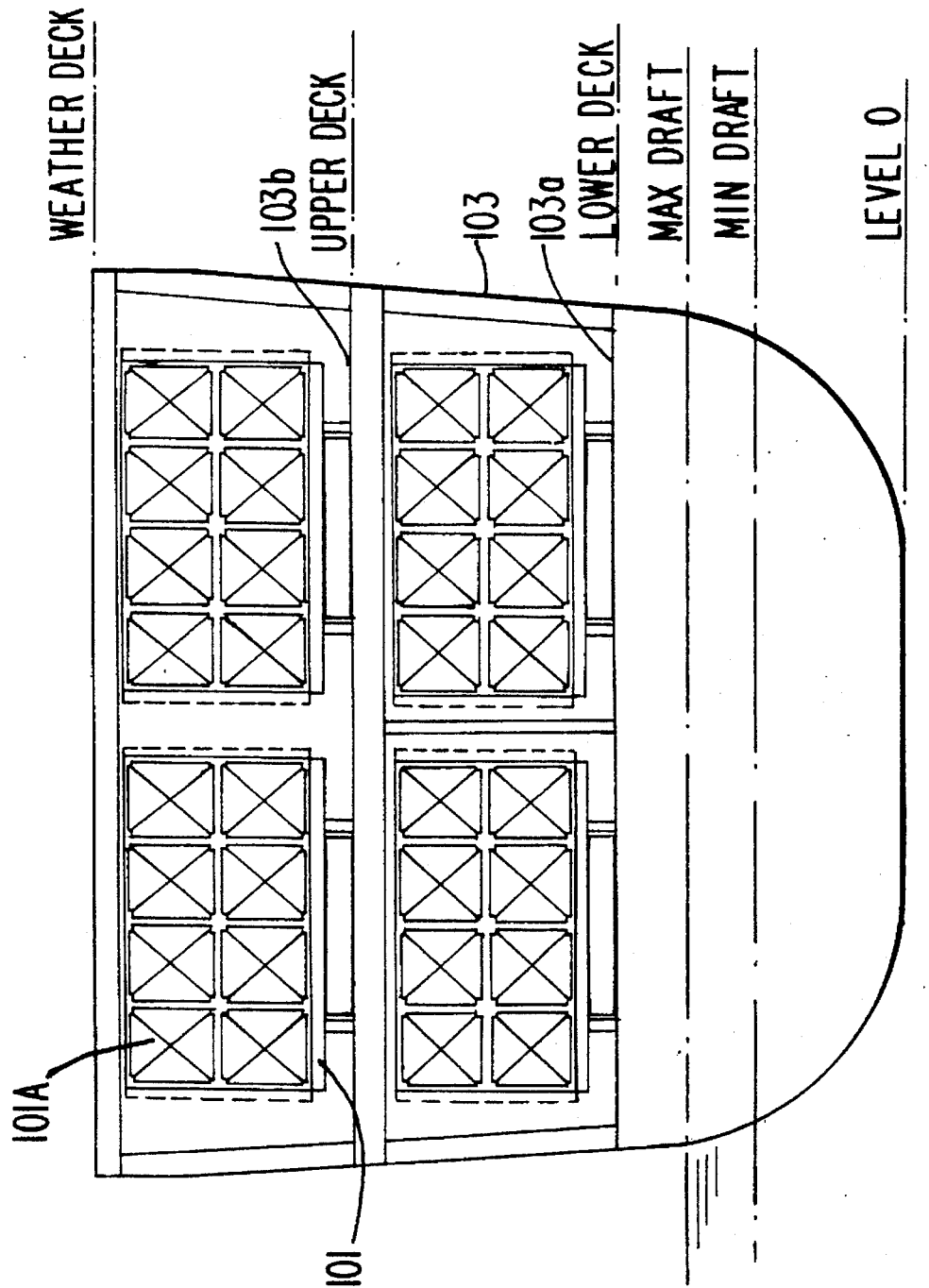

5,618,148

METHOD AND ARRANGEMENT FOR TRANSPORTING LARGER UNITS

FIELD OF THE INVENTION

The present invention relates to a method for transporting larger units, especially loading and unloading containers.

The present invention also relates to an arrangement for such transport.

STATE OF THE ART

There are previously known cargo ships for loading and unloading containers, whereby loading and unloading is carried out either by means of cranes on board the ship itself, or by means of cranes provided in the quay area. Such prior art systems are hamped with the disadvantage that loading and unloading is very time consuming, because each separate container must be handled individually, i.e. be transferred to crane position, lifted on board by means of crane, anchored on board the vessel, whereafter the crane returns to the next handling operation.

U.S. Pat. No. 4,770,589 (Bryan) relates to a cargo handling system including cargo containers having recesses extending through the lower central region of the containers, which recesses straddle rail-shaped turntable/elevator modules used for transferring containers in various straight, horizontal, vertical and inclined directions.

This previously known system operates independent of cranes, but is committed to comprising rail-shaped modules also on board the cargo ship, which entails a very limited flexibility both regarding storage space and the use of deck space for other purposes.

DE patent publication 2,555.652 (Winsemius) discloses an arrangement for moving heavy loads across a ship deck by means of beams which extend between reinforcements on each side of the ship deck. The beams which are arranged across the deck are also used as skid beams during transportation. In order to handle large loads several parallel beams can be used, and several wagons can carry the larger load for transferring this to a position above the deck level. In order to cater for any movement of the ship, said beams are provided with links at a support position on the quay. This prior art system is however not applicable in a system aiming for a large loading and unloading capacity, since the load itself must be removed from said prior art wagons before being put into storage position in the hold of the vessel in question.

DK patent publication 165.235 (Ravez et al.) relates to a system for transferring loads, especially fast transfer of loads on pallets. The prior art system is designed for transferring pallets from a vehicle to a land based conveyor arrangement, wherein are arranged a wagon provided with a plurality of gripping means designed as forks and being equipped with roller means. The conveyor arrangement is part of a storage building, which comprises an alignement means for bringing the conveyor arrangement in line with the loading/unloading level of the vehicle in question. This prior art system is designed for handling loads of for example 15–20 tons, and is of no value in connection with handling loads or pallets in the range of 400–800 tons.

SE patent publication 461.522 (F Piazzano) relates to a transportation system for transporting structural elements in an industrial plant, said transporting system comprising a vehicle including a platform and two wagons which can run along guiding rails whilst carrying said platform, said wagons being provided with means for being swivelled around a vertical axtial line so as to allow transportation of said vehicle in two crossing directions. This prior art transport system is committed to a limited area and comprises sophisticated mechanical means in the floor system integrated as a part of the wagon system, which mechanical means are vulnerable to other heavy traffic in this area. Further, this publication does not mention anything about transferring large loads including a pallet and a plurality of containers loaded and anchored thereupon, let alone that such container pallets should be transported in a port area without hampering any other traffic in the same area.

U.S. Pat. No. 3,727,776 (Meeusen) relates to a method of and means for loading and unloading containers in or from container ships in connection with so-called containerization, the transfer of containers being carried out by stationary, endless conveyors both at the terminal and on board the ship. Consequently, such conveyors constitute a part of the ship, and said containers are transferred as a long train along said conveyors and are finally loaded at various deck levels by means of a hoist. The prior art system does not suggest the transfer of sets or groups of larger containers positioned on a "mega" pallet which are a transferred by means of separate trains of transfer trolleys, and then independently of any conveyors on land or on board the ship.

OBJECTS OF THE INVENTION

An object of the present invention is to provide a loading and unloading system which is specifically fast and effective, and which particularly finds application in connection with high-speed container boats.

It is to be understood that such container boats could be vessels comprising one, two or several hulls, but common for all such vessels is the inclusion in a system in which the loading and unloading time is reduced to a minimum, at the same time, safety, service and stand-by operation are kept at an optimum level.

On the basis of the development taking place in the field of container transport by sea, the requirement for a new and faster loading and unloading system has become of vital importance both as regards to actual ports and wishes from the chartering agents. One objective should therefore be that a system should load, possibly unload, up to 600 containers in approximately 3 hours. Further, the system should be such that it is not committed to the ship as such, i.e. the main transferring units of the system should be located on shore, such that the vulnerability as regards reliability in operation is reduced to a minimum.

Consequently, another object of the present invention is to provide a method and an arrangement related to loading and unloading of larger units, wherein the associated mechanical equipment on board the ship should be reduced to a minimum so as to avoid extra weight, for thereby avoiding loss of loading capacity especially in connection with high-speed ships.

Still another object of the present invention is to avoid sophisticated mechanical equipment on board for thereby avoiding complicated, time consuming and cost consuming maintenance.

Another object of the present invention is to provide a method of and arrangement for loading and unloading "mega" pallets carrying a plurality of containers, wherein commonly available rails are used on deck, which rails communicate with associated rails on shore, and wherein special transfer trolleys will be part of the port equipment for being maintained on land.

Yet an object of the present invention is to provide a system which is flexible as regards addressing each "mega" pallet and the containers to be carried thereby, as well as a system which is favourable as regards a fast distribution of pallets on land.

BRIEF DISCLOSURE OF THE INVENTION

The above objects are achieved by a method and an arrangement according to the invention, which are based on the idea that a plurality of containers are positioned on a large pallet and are locked to each other and to said container.

Such a pallet can carry up to approximately 20–25 containers having a total weight up to 600–875 tons.

Preferably, the positioning of containers on a large pallet is carried out on land and by means of portal or overhead cranes for stacking and locking said containers, which thereafter can be transferred from land to ship in a roll-on-roll-of fashion, preferably by means of a plurality of trolleys which are allowed free access underneath the pallet for picking up said pallet and transferring same on board the vessel.

Preferably, such a method and system may comprise electrical, diesel driven or hydraulic transfer trolleys having liftable and lowerable carrying elements comprising safety blocks insuring both the load and equipment against overload.

It is to be understood that such transfer trolleys could comprise air-cushion means or wheel or roller means, and possibly electronic or magnetic means adapted for guiding said trolleys along tracks representing the path of transportation.

In a preferred arrangement such trolleys could be adapted to running on rails, wherein a first set of trolleys could be adapted to run forth and back in a first direction, and wherein a second set of trolleys could be adapted to running forth and back in a second direction, substantially under a right angle in relation to said first direction.

In order to cater for tide water changes, said method and arrangement according to the invention could favourably comprise means for compensating such tide water level changes during any transfer of such large items.

BRIEF DISCLOSURE OF THE DRAWINGS

FIG. 4 illustrates schematically a side view of a land based arrangement holding a plurality of pallets including containers, which land area is equipped with hoisting cranes for individual handling of containers.

FIG. 5 illustrates on a larger scale a side view of a pallet carried by an associated train of trolleys.

FIG. 6 is a plan view illustrating another embodiment of the invention according to the present invention, including appropriate means for compensating the tide water level changes that might occur during transfer.

FIG. 7 is a side view seen in the direction of arrows 7—7 in FIG. 6.

FIG. 8 is a cross sectional view through the containership illustrated in FIGS. 6 and 7.

DESCRIPTION OF EMBODIMENTS

In the enclosed drawings there are illustrated embodiments of a new loading and unloading system, especially for serving high-speed container vessels, especially designated Container Pallet Transfer system (CPT).

Figure 2:
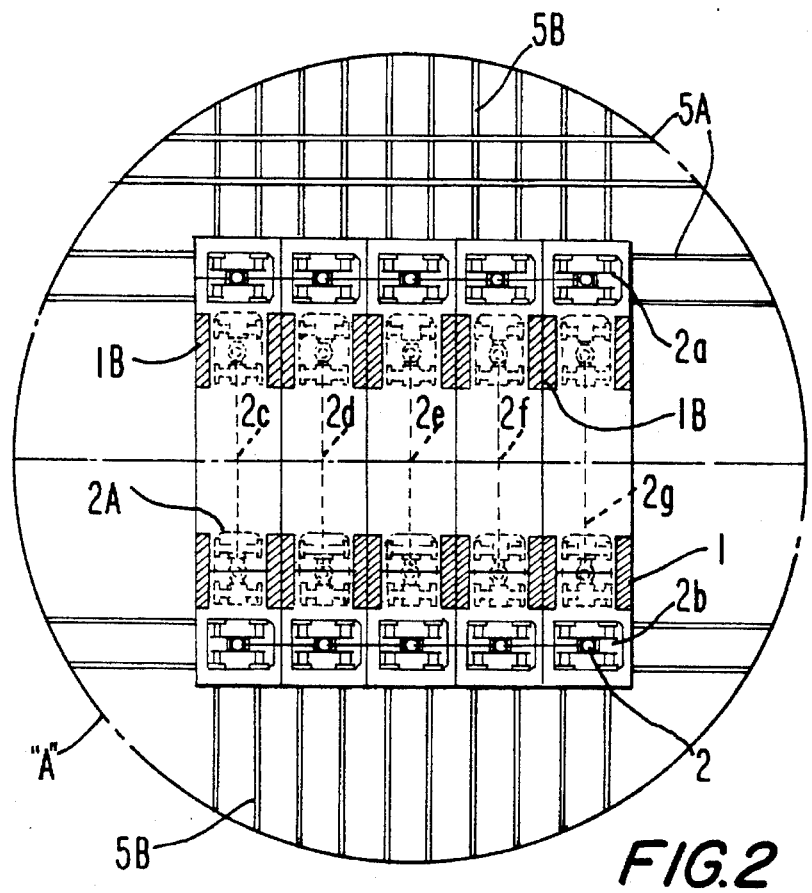
FIG. 2 illustrates on a larger scale a plan view of a detail of the arrangement illustrated in FIG. 1, especially an area of crossing rail systems, wherein different trains of trolleys adapted to crossing each other for changing transport direction of the special pallet according to the invention.
Figure 3:
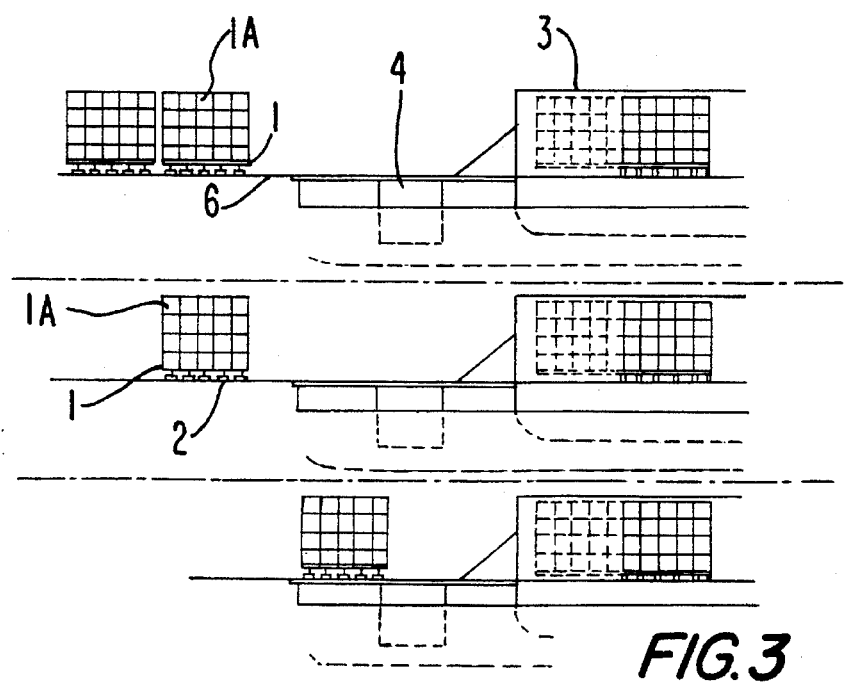
FIG. 3 is a schematical side view on a smaller scale, of the area of the stern of a transport vessel, which depicts the transfer of a container pallet from land to a vessel at different tide waters.

This CPT system is designed from the idea that several containers 1A can be positioned on a large pallet 1 and be locked in relation thereto, see especially FIGS. 2 and 3. Such a pallet can carry for example up to 20–25 containers having a total weight up to 600–875 tons, such weights requiring a very special handling as this will be disclosed in the following.

The pallet or pallets are handled by a set of transfer trolleys or transfer wagons 2, which are supplied with energy from a diesel or electrically driven hydraulic aggregate. The transit trolleys 2 are provided with their own power pack and lifting cylinders. Further, the transfer trolleys 2 are provided with a hydraulic safety block or safety valve ensuring that both load and equipment is protected against overloading.

This safety block together with the hydraulic system render a transport of the pallets possible on slopes up to approximately ±2 degrees, and for passing knuckles or other unevenness regarding the rails, see FIG. 3 at the bottom, and FIG. 5.

In order to achieve the desired loading/unloading capacity the pallet 1 has been designed in such a manner that said transfer trolleys 2 can be driven in underneath the pallet 1 from all sides thereof. In this way it is possible for the total cycle to be broken down into a smaller number of cycles operating simultaneously.

DESCRIPTION OF AN UNLOADING OPERATION

The vessel 3 arrives at the harbour and is moored at a fixed position. The stern ramp of the vessel is lowered onto the quay 6, or alternatively on a link-span 4, if there are considerable tide differences.

The transfer trolleys 2 arranged as two parallel trains 2a and 2b, respectively, are driven out on a first set of rails 5A, that correspond both on land 6 and on board 3, said trolley trains 2a and 2b being driven in underneath a pallet 1 on board and positioned underneath the same. The hydraulic lifting cylinders of each transfer trolley lift the selected pallet 1 out of its locks on the deck of the vessel, and transfer the pallet out of the vessel to crossing point "A" before the pallet is lowered on to the ground. Thereafter, the transfer trolley trains 2a, 2b return with cylinders in lowest position on board the vessel 3 along the rails 5A arranged along the deck thereof, in order to fetch the next pallet to crossing point "A".

The previous pallet 1 in the crossing point "A", see FIG. 2, will immediately be fetched by crossing sets of trains 2c–2g of substantially similar transfer trolleys 2A, so as to be transferred thereby via crossing rails 5B to another crossing point "B", where said pallet 1 will be lowered on the ground, and said second set of transfer trains 2c–2g are returned to its resting position, between crossing point "A" and "B".

Figure 1:
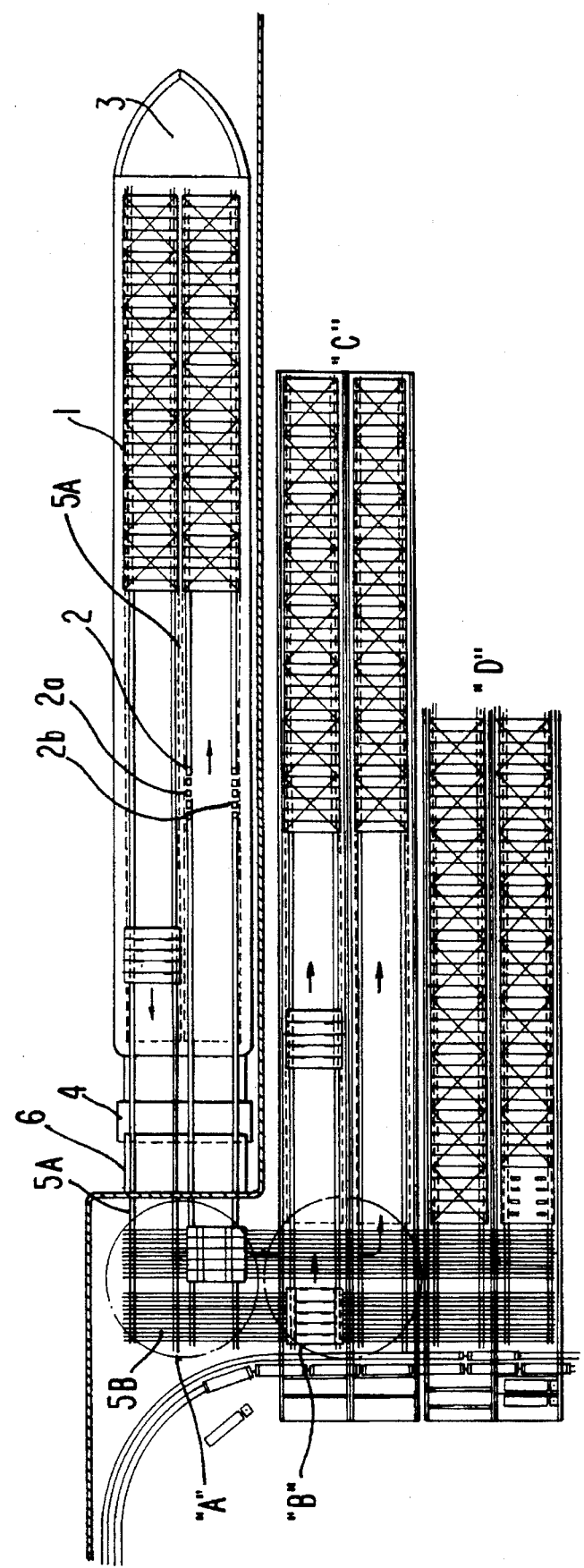
FIG. 1 is a plan view of a first embodiment of an arrangement according to the invention, whereby the method according to the invention can be carried out.

The pallet which has been transferred to the crossing point "B", see FIG. 1, will in the same way be fetched by another set of trains, preferably of the type 2a, 2b as describe previously, from the storage line "C" and be transferred to the first available position in the associated storage.

In this manner all sets of transfer trains are in operation for transferring pallets until the ship is empty, whereafter loading can be initiated from an adjacent storage "D" in the same manner, but in reverse.

When the vessel has departed the quay the container cranes 7 can bring the previously stored containers to waiting railway trains or trucks 8, and fill up the pallets with new containers before the return of any vessel.

Consequently, the above described transport system does not require more than 3 sets of pallets and these are restricted to the quay side and will not leave the port except on board a vessel communicating with such a transport system. These pallets may therefore be considered as a part of this container pallet transfer system.

In FIGS. 6–8 there is illustrated a second embodiment of the method and arrangement according to the present invention, which is especially favourable when dealing with a vessel 103 having a lower deck 103a and an upper deck 103b, both decks 103a and 103b being provided with rails 105A communicating with similar rails on shore.

Also here the method and the arrangement according to the present invention includes the following steps:

a) a plurality of containers 101A are positioned on a large pallet 101 and are locked to the pallet and possibly to each other, b) the pallet 101 with containers 101A are lifted and transported by at least one, possibly more transfer trolleys 102 to a larger transport vessel 103, for example a sea-going vessel, c) the pallet 101 with containers 101A are anchored to the transport vessel 103 and the transfer trolley or trolleys 102 are removed from the pallet 101 for transferring a subsequent pallet with containers, etc., until the vessel is loaded, d) unloading at the port of destination takes place in a substantial opposite sequence.

Also here the above step a) can be carried out on land and by means of suitable portal or overhead cranes for stacking and locking of containers 101A on appropriate pallets 101.

It is to be understood that an appropriate embodiment of such a large pallet should be provided on its lower side with supporting legs as illustrated as 1B in FIG. 5, or as illustrated as 101B in FIG. 7, or crossbars which therebetween and therearound, respectively allow for free passing of the transfer trolleys 102a, 102b in picking up position, i.e. running in and out from any side of the pallet.

In order to compensate for tide water level changes that might occur during transfer from the quay to the vessel or visa versa, there are in the embodiment according to FIGS. 6–8 provided two sets of loading ramps 110A and 110B, respectively, which in FIG. 7 are illustrated in their lowered position with solid lines, and in their raised position with broken lines, the raising and lowering of each loading ramp being allowed by means of an appropriate linking mechanism 111A and 111B, respectively, fixed in a ramp support frame 112 which follow the motion of the ship when any loading ramp has been lowered. It is to be understood that the ramp support frame 112 is driven up or down by an appropriate power mechanism arranged in for example supporting beams 113, which power mechanism communicates with a level sensing device for thereby positioning the loading ramps 110A and 110B in an approximately horizontal position in pace with any heaving movement of the vessel 103.

The supporting columns 113 also constitute a hoist structure including a first lifting platform 114 and a bridge platform 115 arranged with a fixed spacing above the first lifting platform 114 to follow the movements thereof, the driving means of said co-operating lifting platform 114 and bridge platform 115 being controlled by limit switches arranged at the levels of the heave adjustable loading ramps 110A and 110B, but also being able to override such positions in order to communicate with ground level 106 and the level of a second lifting platform 116 arranged adjacent to said first lifting platform 114 and said bridge platform 115.

It is to be understood that in the embodiment illustrated in FIGS. 6–8 there are suggested two sets of such platforms in the overall hoist structure 113, see especially FIG. 6.

It is also to be understood that this form of compensation means could include any number of lifting platforms having a ramp support frame which can be raised from and lowered upon the structure of a vessel to be loaded/unloaded, all in dependence on the capacity of the overall system, and also depening on whether such a hoisting structure should communicate with a vessel having one, two or any other number of decks.

Further, it is to be understood that the number and type of transfer trolleys to be used for transferring the specific pallets according to the invention, could comprise air-cushion means or wheel or roller means, and possibly electronic or magnetic means adapted for guiding said trolleys along cracks representing the parts of transportation.

As described previously, a favourable embodiment could comprise trolleys running on rails, which rails could be elevated rails or lowered rails, all in consideration of not being an obstacle to any other crossing traffic.

It is also to be understood that when trolleys running on rails are preferred, such trolleys could be arranged in a first set of trolleys adapted to run forth and back in a first direction, as well as a second set of trolleys adapted to run forth and back in a second direction, which second direction could be substantially at a right angle in relation to said first direction.

In any of the described embodiments said first set of trolleys could comprise one or more first trains of trolleys, for example one or more trolleys in each train, and said second set of trolleys could comprise one or more second trains of trolleys, for example each train comprising one or more trolleys, and in such a system it would be appropriate to provide associated substantially parallel sets of rails for each set of trolley trains.

It is also to be understood that the capacity of any quay arrangement can be expanded depending on the number of calls per day or hour, and the number of rail pairs on any vessel can of course be varied within wide limits. By using flush mounted rails on the loading deck of the vessels the deck can be used for other purposes than container transport.

The method and the arrangement according to the present invention is very favourable as regards loading and/or unloading a vessel according to a predetermined program which optimizes the distribution of weight on the deck of the vessel, such a program communicating with cranes being equipped with counter means and data systems, such that each container with its specific data can have its position on the selected pallet registered, and thereby being included in a complete storage control system.

What claim:

1. A method for transporting larger units, especially for loading and unloading containers using a pallet comprising the steps of:
   a) positioning a plurality of containers on said pallet, said pallet being a large pallet for carrying up to about 25 of said containers, and locking said containers to said pallet and to each other,
   b) lifting said pallet with containers and transporting same by at least one land-based transfer trolley to a larger transport vessel, said lifting step further comprising driving said at least one transfer trolley underneath said pallet,
   c) anchoring said pallet with containers to said transport vessel and removing said at least one transfer trolley from said pallet for transferring a subsequent pallet with another set of containers until said transport vessel is loaded,
   d) unloading at a port of destination in substantial opposite sequence.

2. The method of claim 1, wherein said pallet at a lower side thereof comprises supporting legs which therebetween allow access for at least one transfer trolley in picking up position.

3. The method of claim 1 or 2, wherein step a) is carried out on land and by using at least one of portal and overhead cranes for stacking and locking of containers on appropriate pallets.

4. The method of claim 2, wherein said access between said supporting legs is from any side of said pallet.

5. The method of claim 1, wherein step b) is carried out by means of said at least one trolley comprising transporting means selected from the group consisting of air-cushion means, wheels, and roller means.

6. The method of claim 5, wherein said transporting means further comprises one of (a) magnetic means and (b) electric means for guiding said at least one transfer trolley along paths of transportation.

7. The method of claim 5, wherein said at least one transfer trolley runs on a set of rails.

8. The method of claim 1, wherein step b) is carried out by means of a first set of trolleys which are allowed to move forth and back in a first direction and a second set of trolleys which are allowed to move forth and back in a second direction substantially at a right angle to said first direction.

9. The method of claim 8, wherein said first set of trolleys comprises at least one train of trolleys, and that said second set of trolleys comprises at least one train of trolleys, wherein each of said train of trolleys comprises one or more trolleys, said method further comprising providing for each train of trolleys a corresponding substantially parallel set of rails.

10. The method of claim 1 wherein said least one transfer trolley is one of (a) electrical and (b) hydraulic trolley having raisable and lowerable support elements, said method further comprising controlling overload.

11. The method of claim 1, wherein said larger transport vessel is a sea-going vessel.

12. Apparatus for transporting a larger unit, especially for loading and unloading containers, said apparatus comprising:

pallets, each of said pallets having an upper side and a lower side, said upper side being adapted for receiving and locking a plurality of containers and said lower side comprising supporting legs or crossbars which therebetween or therearound, respectively, allow for free passage of at least one transfer trolley in picking up position;

means for compensating for tide water level change that occur during transfer, wherein said means for compensating for tide water level change comprises at least one loading ramp having a first end which can be lowered onto the structure of a vessel and a second end which is supported by a ramp supporting frame adapted to following the motion of the vessel; and at least one lifting platform adjacent sold at least one loading ramp, said second end of said at least one loading ramp comprising a limit switch which serves as a level sensing device for said at least one lifting platform.

13. The apparatus of claim 12, wherein said at least one transfer trolley is one of (a) electrical, (b) diesel driven and (c) hydraulic, said at least one transfer trolley having liftable and lowerable carrying elements comprising safety blocks ensuring both load and equipment against overload.

14. The apparatus of claim 12 or 13, wherein said at least on transfer trolley comprises one of (a) air-cushion means, (b) wheels, and (c) roller means.

15. The apparatus of claim 14, wherein said at least one transfer trolley further comprise one of (a) electric means, and (b) magnetic means, for guiding said trolley along paths of transportation.

16. The apparatus of claim 15 wherein said paths of transportation comprise a set of rails.

17. The apparatus of claim 12, wherein said at least one trolley runs on rails.

18. The apparatus of claim 12 comprising at least a first set of trolleys adapted to run forth and back in a first direction, as well as a second set of trolleys adapted to run forth and back in a second direction, said second direction being substantially at a right angle to said first direction.

19. The apparatus of claim 18 wherein said first set of trolleys comprises one or more trolleys in a first train, and said second set of trolleys comprises one or more trolleys, in a second train, said apparatus further comprising a substantially parallel set of rails for each set of trolley trains.

20. The apparatus of claim 12, wherein said means for compensating for tide water level change comprises a link mechanism.

21. The apparatus of claim 12, wherein said plurality of containers comprise between about 20 and about 25 containers.

22. The apparatus of claim 12, wherein said free passage of said at least one transfer trolley occurs at any side of said pallet.

23. The apparatus of claim 12, wherein said means for compensating for tide water level change comprises an intermediate hoist means.

24. The apparatus of claim 12, wherein said limit switch which serves as a level sensing device is connected to a superjacent bridge platform.

25. The apparatus of claim 12, wherein said ramp supporting frame follows the motion of the vessel responsive to a signal from a level sensing device.

26. The apparatus of claim 25, further comprising a land-based hoisting structure having a second lifting platform, said superjacent bridge platform communicating with said second lifting platform.

* * * * *

UNITED STATES PATENT AND TRADEMARK OFFICE
CERTIFICATE OF CORRECTION

PATENT NO. : 5,618,148

DATED : April 8, 1997

INVENTOR(S) : Oyvind T. Iversen et al.

It is certified that error appears in the above-indentified patent and that said Letters Patent is hereby corrected as shown below:

On the title page, "U.S. PATENT DOCUMENTS", "Falko" should be -- Palko --.

Cover Page, under "FOREIGN PATENT DOCUMENTS", "0218493" should be -- 58-218493 --.

Cover Page, under "FOREIGN PATENT DOCUMENTS", "5338816" should be -- 5-338816 --.

Cover Page, under "FOREIGN PATENT DOCUMENTS", "5338815" should be -- 5-338815 --.

Column 1, line 34, "2,555.652" should be -- 2,555,652 --.

Column 1, line 52, "land based" should be -- land-based --.

Column 2, line 23, "are a" should be -- are --.

Column 3, line 23, "roll-of" should be -- roll-off --.

UNITED STATES PATENT AND TRADEMARK OFFICE
CERTIFICATE OF CORRECTION

PATENT NO.  : 5,618,148
DATED       : April 8, 1997
INVENTOR(S) : Øyvind T. Iversen et al.

It is certified that error appears in the above-indentified patent and that said Letters Patent is hereby corrected as shown below:

Column 3, line 64, "land" should be -- land- --.
    Column 4, line 9, "cross sectional" should be -- cross-sectional --.
    Column 5, line 1, "I" should be -- 1 --.
    Column 5, line 11, "describe" should be -- described --.
    Column 8, line 9, "occur" should be -- occurs --.
    Column 8, line 25, "on" should be -- one --.
    Column 8, line 28, "comprise" should be -- comprises --.
    Column 8, line 42, "trolleys," should be -- trolleys --.

Signed and Sealed this

Twentieth Day of March, 2001

Attest:

NICHOLAS P. GODICI

*Attesting Officer*    *Acting Director of the United States Patent and Trademark Office*